(12) United States Patent
Palmer et al.

(10) Patent No.: US 12,377,764 B2
(45) Date of Patent: Aug. 5, 2025

(54) VENTILATED SEAT AND METHOD OF MAKING

(71) Applicant: Lear Corporation, Southfield, MI (US)

(72) Inventors: Mark Antony Palmer, West Haddon (GB); Wreford Graham Cox, Paignton (GB)

(73) Assignee: Lear Corporation, Southfield, MI (US)

( * ) Notice: Subject to any disclaimer, the term of this patent is extended or adjusted under 35 U.S.C. 154(b) by 54 days.

(21) Appl. No.: 18/090,921

(22) Filed: Dec. 29, 2022

(65) Prior Publication Data

US 2023/0271536 A1 Aug. 31, 2023

Related U.S. Application Data

(60) Provisional application No. 63/314,574, filed on Feb. 28, 2022.

(51) Int. Cl.
*B60N 2/56* (2006.01)
*B60N 2/58* (2006.01)
*B60N 2/64* (2006.01)

(52) U.S. Cl.
CPC ......... *B60N 2/5642* (2013.01); *B60N 2/5621* (2013.01); *B60N 2/5833* (2013.01); *B60N 2/646* (2013.01)

(58) Field of Classification Search
CPC ................ B60N 2/5621; B60N 2/5642
See application file for complete search history.

(56) References Cited

U.S. PATENT DOCUMENTS

| 4,699,427 | A | * | 10/1987 | Kobayashi | B64D 11/06 |
| | | | | | 297/452.61 |
| 4,802,939 | A | * | 2/1989 | Billarant | B29C 33/0044 |
| | | | | | 24/444 |
| 5,067,772 | A | | 11/1991 | Koa | |
| 5,544,942 | A | * | 8/1996 | Vu Khac | B60N 2/70 |
| | | | | | 297/452.37 |
| 7,108,319 | B2 | * | 9/2006 | Hartwich | B60N 2/5635 |
| | | | | | 297/180.16 |
| 7,114,771 | B2 | | 10/2006 | Lofy et al. | |

(Continued)

FOREIGN PATENT DOCUMENTS

| CN | 114715002 A | * | 7/2022 |
| CN | 116834627 A | * | 10/2023 |

(Continued)

*Primary Examiner* — Timothy J Brindley
(74) *Attorney, Agent, or Firm* — MacMillan, Sobanski & Todd, LLC

(57) ABSTRACT

A ventilated seat includes a cushion pad, including a plurality of air distribution holes therethrough, and having a hook-loop fastener affixed thereto; a seat bottom including a main bottom cushion; a seat back operatively engaging the seat bottom and including a main back cushion; wherein one of the main bottom cushion and the main back cushion is comprised of a closed cell foam, includes a recess that is shaped to receive and orient the cushion pad therein, a ventilation passage for directing airflow from a climate control system to the recess, and a hook-loop fastener molded into the closed cell foam in the recess; and wherein the cushion pad is secured in the recess by the hook-loop fastener of the cushion pad operatively engaging the hook-loop fastener in the recess.

14 Claims, 3 Drawing Sheets

(56) References Cited

U.S. PATENT DOCUMENTS

| | | | |
|---|---|---|---|
| 8,491,057 B2 * | 7/2013 | Demontis | B60N 2/7017 |
| | | | 297/180.13 |
| 9,365,143 B2 * | 6/2016 | Sachs | A47C 7/18 |
| 9,403,460 B2 | 8/2016 | Hickey et al. | |
| 9,440,567 B2 | 9/2016 | Lazanja et al. | |
| 9,936,773 B2 * | 4/2018 | Okuda | A44B 18/0076 |
| 10,207,618 B2 * | 2/2019 | Cheon | B60N 2/90 |
| 11,186,210 B2 | 11/2021 | Abe | |
| 11,857,079 B2 * | 1/2024 | Rajaratnam | A47C 7/18 |
| 2009/0033130 A1 * | 2/2009 | Marquette | A47C 7/74 |
| | | | 297/180.15 |
| 2016/0096460 A1 * | 4/2016 | Storgato | B60N 2/5621 |
| | | | 297/180.13 |
| 2017/0248146 A1 * | 8/2017 | Wheeler | F04D 29/624 |
| 2021/0300218 A1 * | 9/2021 | Greenwood | B60N 2/5657 |

FOREIGN PATENT DOCUMENTS

| | | | | |
|---|---|---|---|---|
| DE | 102019005948 A1 * | 2/2021 | | B60H 1/00285 |
| WO | WO-2015030195 A1 * | 3/2015 | | B60N 2/56 |
| WO | WO-2021126813 A1 * | 6/2021 | | B60N 2/5642 |

* cited by examiner

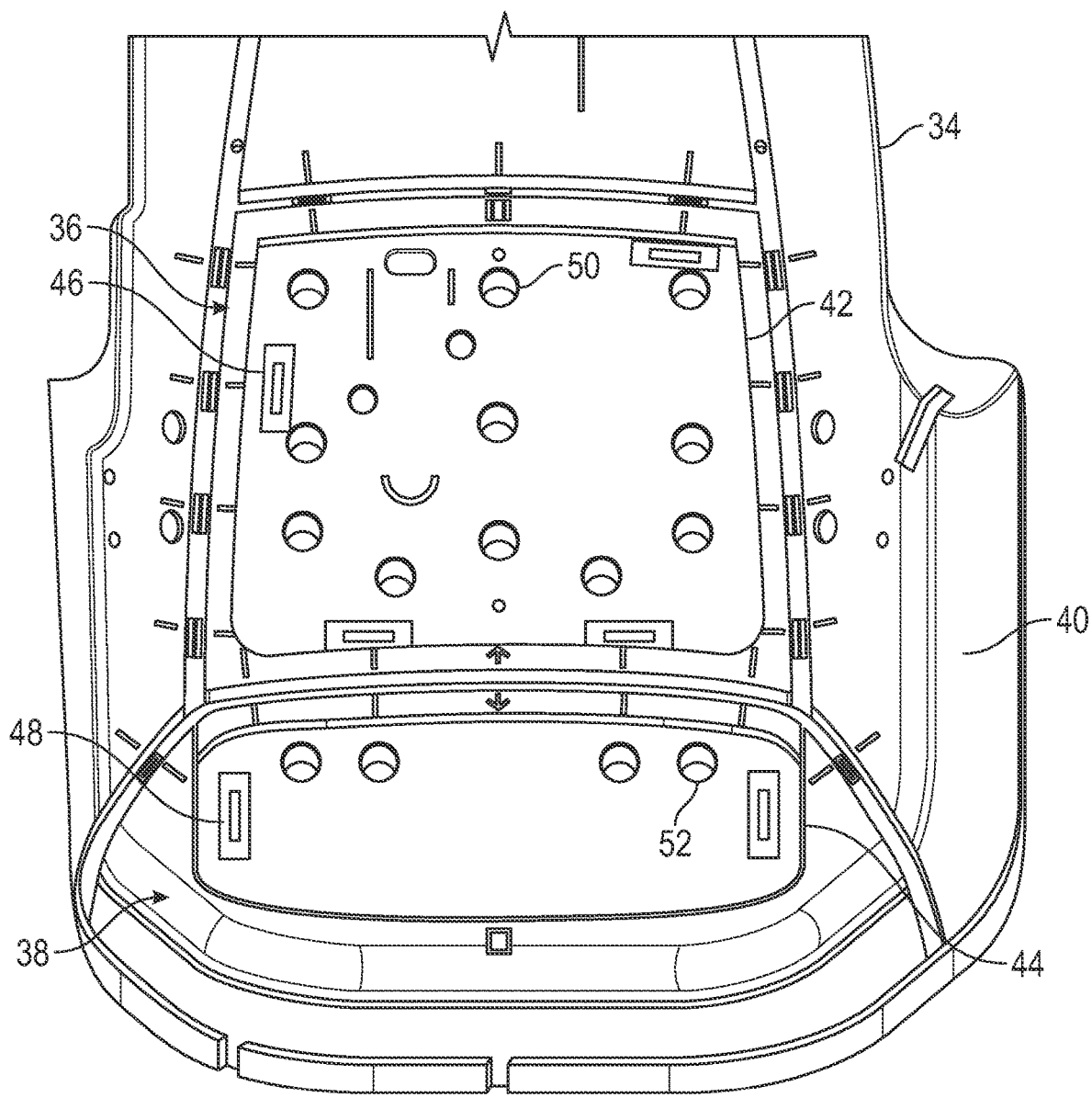
FIG. 3
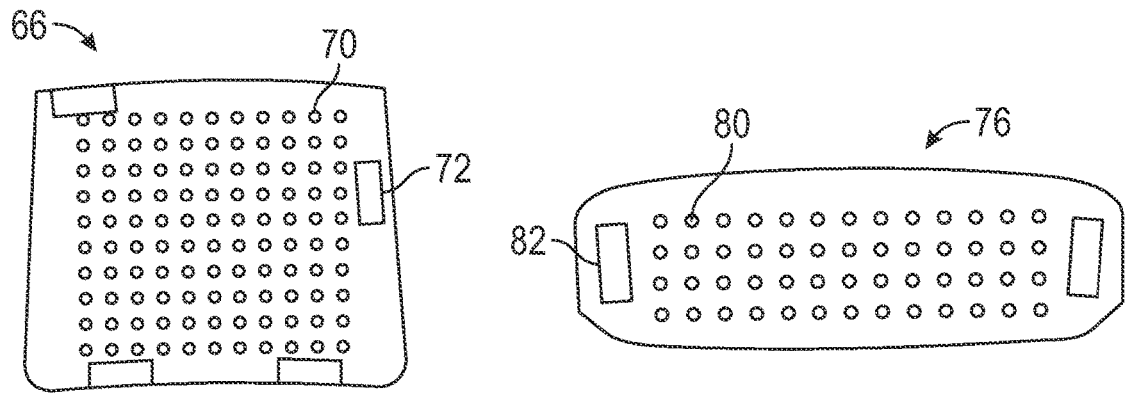
FIG. 4                    FIG. 5

VENTILATED SEAT AND METHOD OF MAKING

CROSS REFERENCE TO RELATED APPLICATION

This patent application claims the benefit of U.S. provisional application 63/314,574, filed Feb. 28, 2022, the entire contents of which are incorporated herein by reference.

BACKGROUND OF THE INVENTION

This invention relates to an improve structure for a ventilated seat.

Ventilated seats are known to provide heating, cooling or both to a seat occupant. Such heating and cooling may be provided via airflow through the seat itself. Some have provided airflow through seat cushions by employing open cell foam materials that allow for airflow directed through the open foam cells. However, open cell foam has drawbacks relative to seat occupant comfort.

It is desirable to provide the heating and cooling efficiently and with desired airflow to various portions of the seat occupant to increase occupant comfort.

SUMMARY OF THE INVENTION

According to an aspect, the invention provides a ventilated seat including: a cushion pad comprised of a closed cell foam in a shape of a flat plate, including a plurality of air distribution holes from a first to a second side of the flat plate, and having a hook-loop fastener affixed to the first side; a seat bottom including a main bottom cushion; a seat back operatively engaging the seat bottom and including a main back cushion; wherein at least one of the main bottom cushion and the main back cushion is comprised of a closed cell foam, includes a recess in a portion of a surface that is shaped to receive and orient the cushion pad therein, a ventilation passage configured to direct airflow from a climate control system to the recess, and a hook-loop fastener molded into the closed cell foam in the recess; and wherein the cushion pad is secured in the recess by the hook-loop fastener of the cushion pad operatively engaging the hook-loop fastener in the recess and configured to create an air distribution interface for airflow from the ventilation passage through the plurality of air distribution holes.

According to an aspect, the invention provides a method of making a ventilated seat, the method comprising: molding a main cushion, using a closed cell foam, while molding a recess into the main cushion and molding a hook-loop fastener into the recess; creating a ventilation passage through the main cushion having an end within the recess; forming a seat cushion pad, using a closed cell foam, into a flat plate sized and shaped to be received in the recess; fixing a hook-loop fastener to a first side of the flat plate; die-cutting a plurality of holes through the seat cushion pad from the first side to a second side configured to face a seat occupant; and securing the seat cushion pad in the recess by operatively engaging the hook-loop fastener of the seat cushion pad to the hook-loop fastener of the seat cushion.

According to an aspect, the invention provides a desired distribution of airflow to a seat occupant. Ease of assembly is provided by the cushion pads being self-locating in respective recesses in the main cushion, and with hook-loop strips aligning to quickly secure the cushion pads to the respective main cushion. The main cushions having less passages through the closed cell foam, while the relatively thin cushion pads have many more holes to distribute the airflow where desired, may have a lower overall cost of fabrication relative to single piece main cushions with large numbers of holes all of the way therethrough. The air distribution holes in the cushion pads may be die-cut. Closed cell foam being employed for the main cushions and cushion pads may be more comfortable for a seat occupant and more liquid resistant. The cushion pads, being separate from the main cushions may allow for easier change of design for control of the airflow onto the seat occupant.

Various aspects of this invention will become apparent to those skilled in the art from the following detailed description of the preferred embodiments, when read in light of the accompanying drawings.

BRIEF DESCRIPTION OF THE DRAWINGS

FIG. 3 is a schematic, plan view of a portion of a main cushion.

FIG. 4 is a schematic, plan view of an air distribution pad.

FIG. 5 is a schematic, plan view of an air distribution pad.

DETAILED DESCRIPTION OF THE PREFERRED EMBODIMENTS

Figure 1:
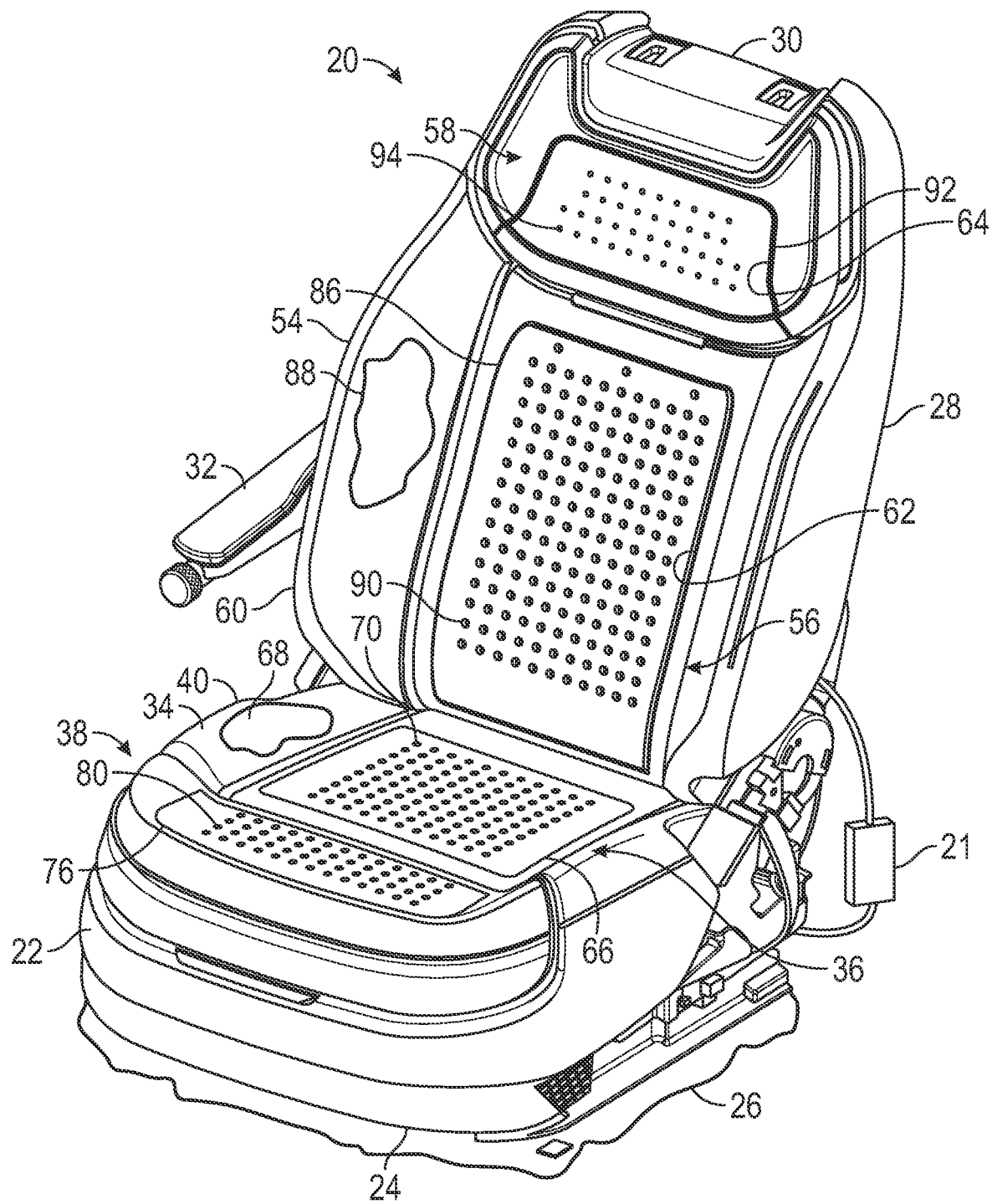
FIG. 1 is a schematic, perspective view of a portion of a seat for use with a seat climate control system.
Figure 2:
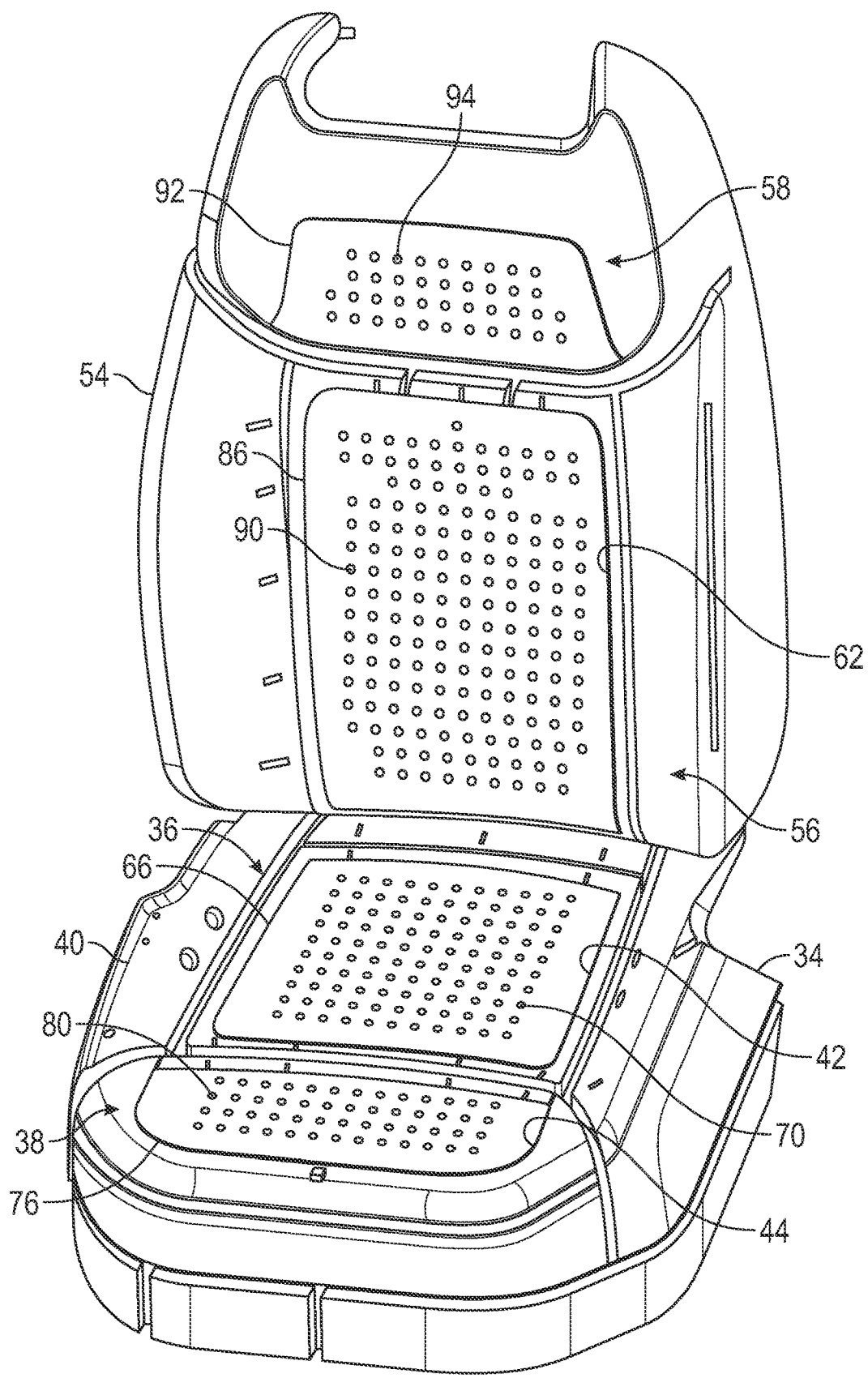
FIG. 2 is a schematic, perspective view of a portion of the seat for use with the seat climate control system.

Referring now to an example illustrated in the drawings, FIGS. 1-5 show portions of a ventilated (climate controlled) seat 20. The seat may be employed, for example, in a vehicle, with the ventilation (climate control) provided for cooling/heating a vehicle occupant sitting on the seat 20. A heating, ventilation and air conditioning (HVAC) system 21 cooperatively engages the seat 20 to provide flow of ventilated air. The ventilated (climate controlled) seat 20 may be used in applications other than vehicles.

The seat 20 includes a seat bottom 22 mounted on a seat frame 24, which may, for example, be mounted to vehicle structure 26. The seat 20 also includes a seatback 28 that operatively engages the seat bottom 22 to define surfaces for a seat occupant to be supported. The seat 20 may also include optional features, such as a headrest mount 30 and an armrest 32.

The seat bottom 22 comprises a main bottom cushion 34, which is made of a closed cell foam material such as a closed cell polyurethan foam. The main bottom cushion 34 is formed in a shape that includes a rear portion 36, which may be configured to support a seat occupant's buttock, a front portion 38, which may be configured to support a portion of an underside of the occupant's thighs, and side bolsters 40, which may laterally support the seat occupant. The terms rear and front as used herein relate to the general orientation of the seat 20 when used in a vehicle. The main bottom cushion 34 is also formed to include a rear recess 42 (best seen in FIG. 3) formed into a top surface of the rear portion 36 and a front recess 44 (best seen in FIG. 3) formed into a top surface of the front portion 38. Molded into the foam in the rear recess 42 are hook-loop strips 46 (illustrated in FIG. 3), with four shown, but other numbers of hook-loop strips 46 may be employed. Molded into the foam in the front recess 44 are hook-loop strips 48 (illustrated in FIG. 3), with two shown, but other numbers of hook-loop strips 48 may be employed. The molded-in strips 46, 48 are only one half of a hook-loop fastener (each strip can be one of a hook or a loop). The corresponding halves of the hook-loop fasteners will be discussed below. Since the main bottom cushion 34 is made of a closed cell foam, ventilation passages are formed through the cushion 34 to allow for the ventilation air to flow from the HVAC system through the cushion 34. The main bottom cushion 34 includes a rear set of ventilation passages 50 (illustrated in FIG. 3) that direct airflow to the rear recess 42, with eleven shown, but other numbers of ventilation passages 50 may be employed. The main bottom cushion 34 includes a front set of ventilation passages 52 (illustrated in FIG. 3) that direct airflow to the front recess 44, with four shown, but other numbers of ventilation passages 52 may be employed. The ventilation passages 50, 52 may be formed in the main bottom cushion 34 by drilling through or molding into the closed cell foam. The term ventilation passages, as used herein, is directed to passages specifically created to allow airflow through closed cell foam, rather than the ability of air to generally flow through open cell foam.

The seatback 28 comprises a main back cushion 54, which is made of a closed cell foam material such as a closed cell polyurethane foam. The main back cushion 54 is formed in a shape that includes a lower portion 56, which may be configured to support a seat occupant's lower back, an upper portion 58, which may be configured to support the occupant's upper back, and side bolsters 60, which may laterally support the seat occupant's back. The terms lower and upper as used herein relate to the general orientation of the seat 20 when used in a vehicle, with the seat back 28 in an upright position. The main back cushion 54 is also formed to include a lower recess 62 formed into a front surface of the lower portion 56 and an upper recess 64 formed into a front surface of the upper portion 58. Molded into the foam in the lower recess 62 are hook-loop strips, which are similar to those illustrated in FIG. 3 for the seat bottom, and molded into the foam in the upper recess 64 are hook-loop strips, which are similar to those illustrated in FIG. 3 for the seat bottom. The molded-in strips again are only one half of a hook-loop fastener (each strip can be one of a hook or a loop). The corresponding halves of the hook-loop fasteners will be discussed below. Since the main back cushion 54 is made of a closed cell foam, ventilation passages are formed through the cushion 54 to allow for the ventilation air to flow from the HVAC system through the cushion 54. The main back cushion 54 includes a lower set of ventilation passages, which are similar to those illustrated in FIG. 3 for the seat bottom, and which direct airflow to the lower recess 62, and an upper set of ventilation passages, which are similar to those illustrated in FIG. 3 for the seat bottom, and which direct airflow to the upper recess 64.

The illustrated example also includes a rear seat cushion pad 66 that is sized and shaped to fit into and essentially fill the rear recess 42 such that the top surface of the rear seat cushion pad 66 is essentially flush with the top surface of the rear portion 36 of the main bottom cushion 34. The shape of the rear seat cushion pad 66 is, in essence, a flexible flat plate. This creates a flush surface over which a seat bottom covering 68 may be assembled. The seat bottom covering 68 may be made of, for example, cloth fabric, leather with perforations or other common materials used to upholster a seat. The rear seat cushion pad 66 may be formed of a closed cell foam, such as a closed cell polyurethane. The rear seat cushion pad 66 includes a matrix of air distribution holes 70 extending therethrough from a first side to a second side and that are configured to distribute airflow from the rear ventilation passages 50 to desired locations for airflow onto the seat occupant—essentially forming an air distribution interface between the main bottom cushion 34 and the rear seat cushion pad 66. The thin rear seat cushion pad 66 (relative to the thicker main bottom cushion 34) allows for more holes to be formed quickly and economically during fabrication to achieve the desired airflow relative to the seat occupant. Moreover, the airflow to seat occupants can be changed by merely changing the size and spacing of the air distribution holes 70, without the need to change the design of the main bottom cushion 34. The air distribution holes 70 may be formed in the rear seat cushion pad 66 by, for example, die cutting (punching) the holes 70 through the rear seat cushion pad 66. The fewer rear ventilation passages 50 through the relatively thicker main bottom cushion 34 may be formed, for example, by drilling or molding the passages 50 through the main bottom cushion 34. The rear seat cushion pad 66 has hook-loop strips 72 (illustrated in FIG. 4) affixed to an underside surface, with the number and locations configured to mate with corresponding hook-loop strips 46 of the main bottom cushion 34. That is, if the particular hook-loop strip 46 of the main bottom cushion 34 is a set of hooks, then the corresponding hook-loop strip 72 on the rear seat cushion pad 66 is a set of loops located to mate with the hooks.

The illustrated example also includes a front seat cushion pad 76 that is sized and shaped to fit into and essentially fill the front recess 44 such that the top surface of the front seat cushion pad 76 is essentially flush with the top surface of the front portion 38 of the main bottom cushion 34. The shape of the front seat cushion pad 76 is, in essence, a flexible flat plate. This creates a flush surface over which the seat bottom covering 68 may be assembled. The front seat cushion pad 76 may be formed of a closed cell foam, such as a closed cell polyurethane. The front seat cushion pad 76 includes a matrix of air distribution holes 80 extending therethrough from a first side to a second side and that are configured to distribute airflow from the front ventilation passages 52 to desired locations for airflow onto the seat occupant—essentially forming an air distribution interface between the main bottom cushion 34 and the front seat cushion pad 76. The thin front seat cushion pad 76 (relative to the thicker main bottom cushion 34) allows for more holes to be formed quickly and economically to achieve the desired airflow relative to the seat occupant. Moreover, the airflow to seat occupants can be changed by merely changing the size and spacing of the air distribution holes 80, without the need to change the design of the main bottom cushion 34. The air distribution holes 80 may be formed in the front seat cushion pad 76 by, for example, die cutting (punching) the holes 80 through the front seat cushion pad 76. The fewer front ventilation passages 52 through the relatively thicker main bottom cushion 34 may be formed, for example, by drilling or molding the passages 52 through the main bottom cushion 34. The front seat cushion pad 76 has hook-loop strips 82 (illustrated in FIG. 5) affixed to an underside surface, with the number and location configured to mate with corresponding hook-loop strips 48 of the main bottom cushion 34. That is, if the particular hook-loop strip 48 of the main bottom cushion 34 is a set of hooks, then the corresponding hook-loop strip 82 on the front seat cushion pad 76 is a set of loops located to mate with the hooks.

The illustrated example also includes a lower seat cushion pad 86 that is sized and shaped to fit into and essentially fill the lower recess 62 such that the front surface of the lower seat cushion pad 86 is essentially flush with the front surface of the lower portion 56 of the main back cushion 54. The shape of the lower seat cushion pad 86 is, in essence, a flexible flat plate. This creates a flush surface over which a seat back covering 88 may be assembled. The seat back covering 88 may be made of, for example, cloth fabric, leather with perforations or other common materials used to upholster a seat. The lower seat cushion pad 86 may be formed of a closed cell foam, such as a closed cell polyurethane. The lower seat cushion pad 86 includes a matrix of air distribution holes 90 extending therethrough from a first side to a second side and that are configured to distribute airflow from the lower ventilation passages (similar to the ventilation passages 50, 52 illustrated in FIG. 3) to desired locations for airflow onto the seat occupant—essentially forming an air distribution interface between the main back cushion 54 and the lower seat cushion pad 86. The thin lower seat cushion pad 86 (relative to the thicker main back cushion 54) allows for more holes to be formed quickly and economically to achieve the desired airflow relative to the seat occupant. Moreover, the airflow to seat occupants can be changed by merely changing the size and spacing of the air distribution holes 90, without the need to change the design of the main back cushion 54. The air distribution holes 90 may be formed in the lower seat cushion pad 86 by, for example, die cutting (punching) the holes 90 through the lower seat cushion pad 86. The fewer lower ventilation passages through the relatively thicker main back cushion 54 may be formed, for example, by drilling or molding the passages through the main back cushion 54. The lower seat cushion pad 86 has hook-loop strips (similar to the hook-loop strips 72, 82 illustrated in FIGS. 5 and 6) affixed to a rear surface that are located and configured to mate with the corresponding hook-loop strips of the main back cushion 54. That is, if the particular hook-loop strip of the main back cushion 54 is a set of hooks, then the corresponding hook-loop strip on the lower seat cushion pad 86 is a set of loops located to mate with the hooks.

The illustrated example also includes an upper seat cushion pad 92 that is sized and shaped to fit into and essentially fill the upper recess 64 such that the front surface of the upper seat cushion pad 92 is essentially flush with the front surface of the upper portion 58 of the main back cushion 54. The shape of the upper seat cushion pad 92 is, in essence, a flexible flat plate. This creates a flush surface over which the seat back covering 88 may be assembled. The upper seat cushion pad 92 may be formed of a closed cell foam, such as a closed cell polyurethane. The upper seat cushion pad 92 includes a matrix of air distribution holes 94 extending therethrough from a first side to a second side and that are configured to distribute airflow from the upper ventilation passages (similar to the ventilation passages 50, 52 illustrated in FIG. 3) to desired locations for airflow onto the seat occupant—essentially forming an air distribution interface between the main back cushion 54 and the upper seat cushion pad 92. The thin upper seat cushion pad 92 (relative to the thicker main back cushion 54) allows for more holes to be formed quickly and economically to achieve the desired airflow relative to the seat occupant. Moreover, the airflow to seat occupants can be changed by merely changing the size and spacing of the air distribution holes 94, without the need to change the design of the main back cushion 54. The air distribution holes 94 may be formed in the upper seat cushion pad 92 by, for example, die cutting (punching) the holes 94 through the upper seat cushion pad 92. The fewer upper ventilation passages through the relatively thicker main back cushion 54 may be formed, for example, by drilling or molding the passages through the main back cushion 54. The upper seat cushion pad 92 has hook-loop strips (similar to the hook-loop strips 72, 82 illustrated in FIGS. 5 and 6) affixed to a back side surface that are located and configured to mate with the corresponding hook-loop strips of the main back cushion 54. That is, if the particular hook-loop strip of the main back cushion 54 is a set of hooks, then the corresponding hook-loop strip on the upper seat cushion pad 92 is a set of loops located to mate with the hooks.

An example of the assembly of the cushion pads to the respective main cushions will now be discuss with reference to FIGS. 1-5. Since the main bottom cushion 34 is formed with the recesses 42, 44 and the hook-loop strips 46, 48, the alignment and assembly of the cushion pads 66, 76 to the main bottom cushion 34 is quick, easy, and accurately locates the cushion pads 66, 76. The rear seat cushion pad 66 is aligned with the rear recess 42 and with the hook-loop strips 72 facing toward the rear recess 42. The rear seat cushion pad 66 is moved into contact with the rear recess 42, at which point the hook-loop strips 46 will engage their respective hook-loop strips 72. The rear seat cushion pad 66 is now secured to the main bottom cushion 34 in the correct location and orientation. The seat bottom covering 68 is assembled to the main bottom cushion 34. The front seat cushion pad 76, lower seat cushion pad 86 and upper seat cushion pad 92 are assembled to the corresponding seat components in a similar manner. The seat back covering 88 may be assembled to the main back cushion 54. Accordingly, a seat 20 is created that is comfortable for the seat occupant to sit on while also being able to provide ventilation at the desired locations to the seat occupant.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A ventilated seat comprising:
   a cushion pad comprised of a closed cell foam in a shape of a flat plate, including a plurality of air distribution holes from a first to a second side of the flat plate, and having a hook-loop fastener affixed to the first side;
   a seat bottom including a main bottom cushion;
   a seat back operatively engaging the seat bottom and including a main back cushion;
   wherein at least one of the main bottom cushion and the main back cushion is comprised of a closed cell foam, includes a recess in a portion of a surface that is shaped to receive and orient the cushion pad therein, a ventilation passage configured to direct airflow from a climate control system to the recess, and a hook-loop fastener molded into the closed cell foam in the recess; and
   wherein the cushion pad is secured in the recess by the hook-loop fastener of the cushion pad operatively engaging the hook-loop fastener in the recess and configured to create an air distribution interface for airflow from the ventilation passage through the plurality of air distribution holes.

2. The ventilated seat of claim 1 further comprising:
   a second cushion pad comprised of a closed cell foam in a shape of a second flat plate, including a second plurality of air distribution holes from a first to a second side of the second flat plate, and having a hook-loop fastener affixed to one of the first and second sides of the second cushion pad; and
   wherein the at least one of the main bottom cushion and the main back cushion is the main bottom cushion, with the main bottom cushion further comprising a second recess, spaced from the recess, in a portion of the surface that is shaped to receive and orient the second cushion pad therein, a second ventilation passage configured to direct airflow from the climate control system to the second recess, and a hook-loop fastener molded into the closed cell foam in the second recess; and wherein the second cushion pad is secured in the second recess by the hook-loop fastener of the second cushion pad operatively engaging the hook-loop fastener in the second recess.

3. The ventilated seat of claim 2 further comprising, the second ventilation passage being a plurality of second ventilation passages, and wherein a number of air distribution holes of the second plurality of air distribution holes is greater than a number of the ventilation passages of the second plurality of ventilation passages.

4. The ventilated seat of claim 3 further comprising, the ventilation passage being a plurality of ventilation passages, and wherein a number of air distribution holes of the plurality of air distribution holes is greater than a number of the ventilation passages of the plurality of ventilation passages.

5. The ventilated seat of claim 1 further comprising, the ventilation passage being a plurality of ventilation passages, and wherein a number of air distribution holes of the plurality of air distribution holes is greater than a number of the ventilation passages of the plurality of ventilation passages.

6. The ventilated seat of claim 1 further comprising, an upholstery covering extending over both the cushion pad and the at least one of the main bottom cushion and the main back cushion to which the cushion pad is secured.

7. The ventilated seat of claim 1 wherein the hook-loop fastener of the cushion pad is a plurality of hook-loop fasteners affixed to the first side, the hook-loop fastener of the at least one of the main bottom cushion and the main back cushion is a plurality of hook-loop fasteners molded into the closed cell foam of the recess and located to each mate with a respective one of the plurality of hook-loop fasteners affixed to the cushion pad when the cushion pad is properly oriented in the recess.

8. The ventilated seat of claim 1 wherein the ventilated seat is a vehicle seat, and further including a seat frame secured to the seat bottom and configured to mount to a vehicle structure.

9. A ventilated seat comprising:
a cushion pad comprised of a closed cell foam in a shape of a flat plate, including a plurality of air distribution holes from a first side to a second side of the flat plate, and having a hook-loop fastener affixed to the first side;
a main cushion comprised of a closed cell foam, including a recess in a portion of a surface that is shaped to receive and orient the cushion pad therein, a ventilation passage configured to direct airflow from a climate control system to the recess, and a hook-loop fastener molded into the closed cell foam in the recess; and
wherein the cushion pad is secured in the recess by the hook-loop fastener of the cushion pad operatively engaging the hook-loop fastener in the recess and configured to create an air distribution interface for airflow from the ventilation passage through the plurality of air distribution holes.

10. The ventilated seat of claim 9 further comprising:
a second cushion pad comprised of a closed cell foam in a shape of a second flat plate, including a plurality of air distribution holes from a first side to a second side of the second flat plate, and having a hook-loop fastener affixed to one of the first and second sides of the second cushion pad;
wherein the main cushion further comprises a second recess, spaced from the recess, in a portion of the surface that is shaped to receive and orient the second cushion pad therein, a second ventilation passage configured to direct airflow from the climate control system to the second recess, and a hook-loop fastener molded into the closed cell foam in the second recess; and
wherein the second cushion pad is secured in the second recess by the hook-loop fastener of the second cushion pad operatively engaging the hook-loop fastener in the second recess.

11. The ventilated seat of claim 9 wherein the main cushion is a portion of a seat bottom.

12. The ventilated seat of claim 9 wherein the main cushion is a portion of a seat back.

13. The ventilated seat of claim 9 wherein the ventilation passage is a plurality of ventilation passages, and wherein a number of air distribution holes of the plurality of air distribution holes is greater than a number of the ventilation passages of the plurality of ventilation passages.

14. The ventilated seat of claim 9 wherein the ventilated seat is a vehicle seat, and further including a seat frame operatively engaging the main cushion and configured to mount to a vehicle structure.

* * * * *